US012677320B2

(12) United States Patent (10) Patent No.: US 12,677,320 B2
Takada (45) Date of Patent: Jul. 7, 2026

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Tomoyuki Takada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 18/359,368

(22) Filed: Jul. 26, 2023

(65) Prior Publication Data

US 2023/0371078 A1 Nov. 16, 2023

Related U.S. Application Data

(63) Continuation of application No. PCT/JP2021/041121, filed on Nov. 9, 2021.

(30) Foreign Application Priority Data

Feb. 1, 2021 (JP) ................................. 2021-014558

(51) Int. Cl.
H04W 74/0816 (2024.01)
H04W 74/08 (2009.01)
(52) U.S. Cl.
CPC ... H04W 74/0816 (2013.01); H04W 74/0866 (2013.01)
(58) Field of Classification Search
CPC ......... H04W 74/0816; H04W 74/0866; H04W 48/12; H04W 48/14; H04W 76/15;
(Continued)

(56) References Cited

U.S. PATENT DOCUMENTS

2013/0039200 A1 2/2013 Park et al.
2014/0112247 A1* 4/2014 Chen ..................... H04W 28/18
370/328
(Continued)

FOREIGN PATENT DOCUMENTS

JP 2012523202 A 9/2012
JP 2014522196 A 8/2014
(Continued)

OTHER PUBLICATIONS

Cariou, Laurent (Intel), et al.; CSA/eCSA within AP MLD, doc.: 20/1140r7; Oct. 2020; pp. 1-16.
(Continued)

*Primary Examiner* — Sudesh M. Patidar
(74) *Attorney, Agent, or Firm* — Canon U.S.A., Inc. IP Division

(57) ABSTRACT

A communication apparatus capable of multiple link communication compliant with an IEEE 802.11 series standard, decides a first link, from among a plurality of links established with a communication partner apparatus, which is to be a link with prohibited transmission by the communication partner apparatus, and a transmission prohibition period for the first link, and transmits, using the first link, a first frame including information relating to transmission prohibition for the first link. The communication apparatus transmits, using a second link different from the first link among the plurality of links, a second frame including information relating to transmission prohibition for the first link, before the transmission prohibition period starts.

13 Claims, 5 Drawing Sheets

(58) Field of Classification Search
CPC ..... H04W 76/34; H04W 84/12; H04W 48/08;
H04W 88/06
See application file for complete search history.

(56) References Cited

U.S. PATENT DOCUMENTS

| | | | | |
|---|---|---|---|---|
| 2014/0171056 A1* | 6/2014 | Jafarian | ................ | H04W 48/02 |
| | | | | 455/418 |
| 2015/0057008 A1* | 2/2015 | Seok | ................. | H04W 72/0446 |
| | | | | 455/452.1 |
| 2020/0163141 A1 | 5/2020 | Hsu | | |
| 2020/0221545 A1 | 7/2020 | Stacey | | |
| 2021/0058981 A1* | 2/2021 | Asterjadhi | ........ | H04W 74/0891 |
| 2021/0212141 A1* | 7/2021 | Chu | ...................... | H04W 48/12 |
| 2023/0262800 A1* | 8/2023 | Dong | ................... | H04W 76/15 |
| 2023/0292298 A1* | 9/2023 | Ding | ................. | H04W 28/0967 |
| 2024/0244662 A1* | 7/2024 | Kim | ................... | H04W 74/002 |

FOREIGN PATENT DOCUMENTS

| | | | |
|---|---|---|---|
| WO | 2010117894 | A2 | 10/2010 |
| WO | 2013022293 | A2 | 2/2013 |

OTHER PUBLICATIONS

Patil, Abhishek, et al. (Qualcomm Inc.); MLO Indication of Critical Updates; doc.: IEEE 802.11-20/0586r10; Apr. 2020; pp. 1-21.
Jeongki Kim et al., Minutes for TGbe MAC Ad-Hoc teleconferences in Nov. 2020 and Jan. 2021, Nov. 2020, doc.: IEEE 802.11-20/1765r11.
Edward Au, Compendium of straw polls and potential changes to the Specification Framework Document, Dec. 2020, doc.: IEEE 802.11-20/0566r99.
Edward Au, Specification framework for TGbe, Jan. 2021, doc.: IEEE 802.11-19/1262r22.
Laurent Cariou, MLO: CSA, eCSA and quiet element operation, Feb. 2021, doc.: IEEE 802.11-21/0073r2.
Anonymous, 35. Extremely high throughput (EHT) MAC specification, Jul. 2021, pp. 275-360, IEEE P802.11be/ D1.1.
802.11 Working Group of The LAN/MAN Standards Committee of the IEEE Computer Society, Draft standard for Information technology—Tele-communications and information exchange between systems Local and metropolitan area networks—Specific requirements, Part 11:Wireless LAN Medium Access Control (MAC) and Physical Layer (PHY) Specification, Amendment 8: Enhancements for extremely high throughput (EHT), Sep. 2021.
Abhishek Patil et al., MLO Indication of Critical Updates, Apr. 2020, doc.: IEEE 802.11-20/0586r10.

* cited by examiner

F I G. 1
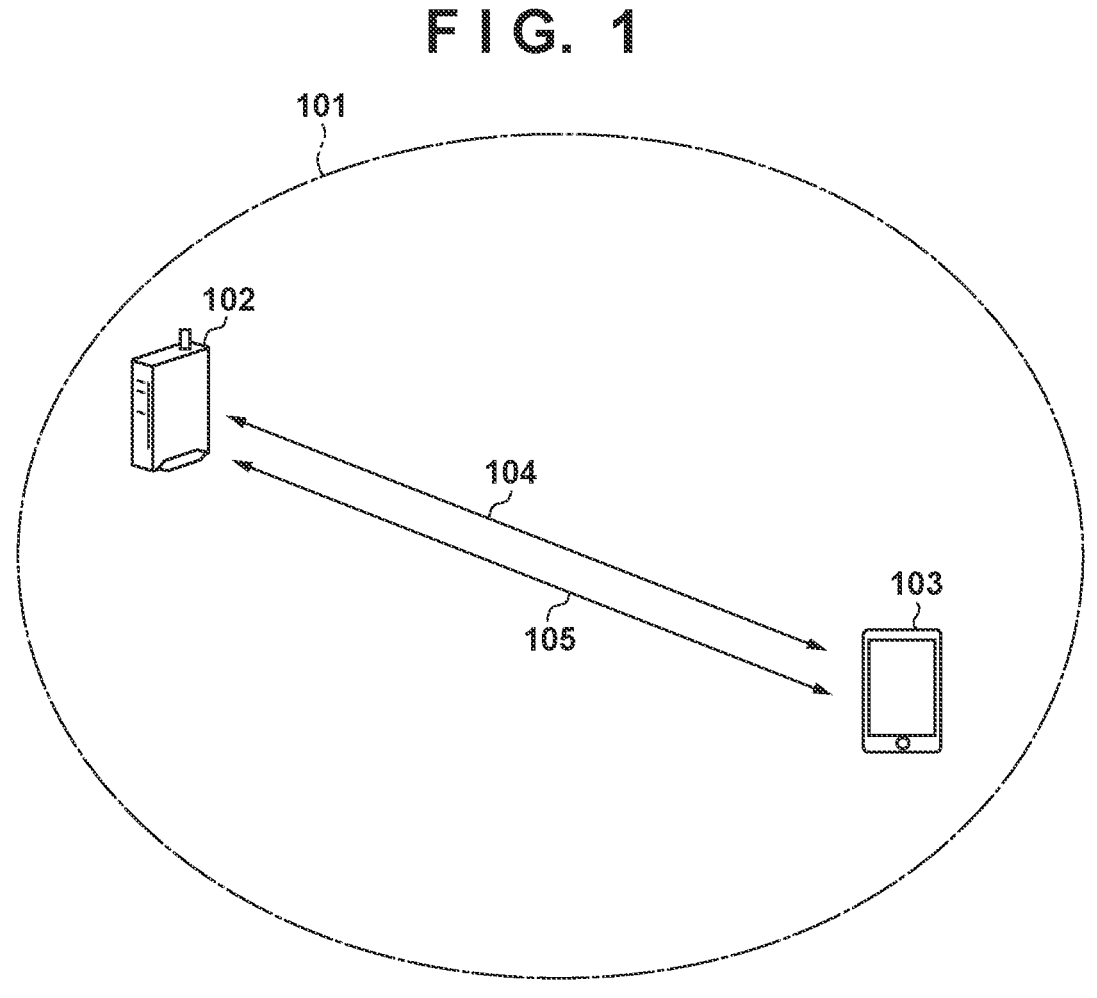

F I G. 4
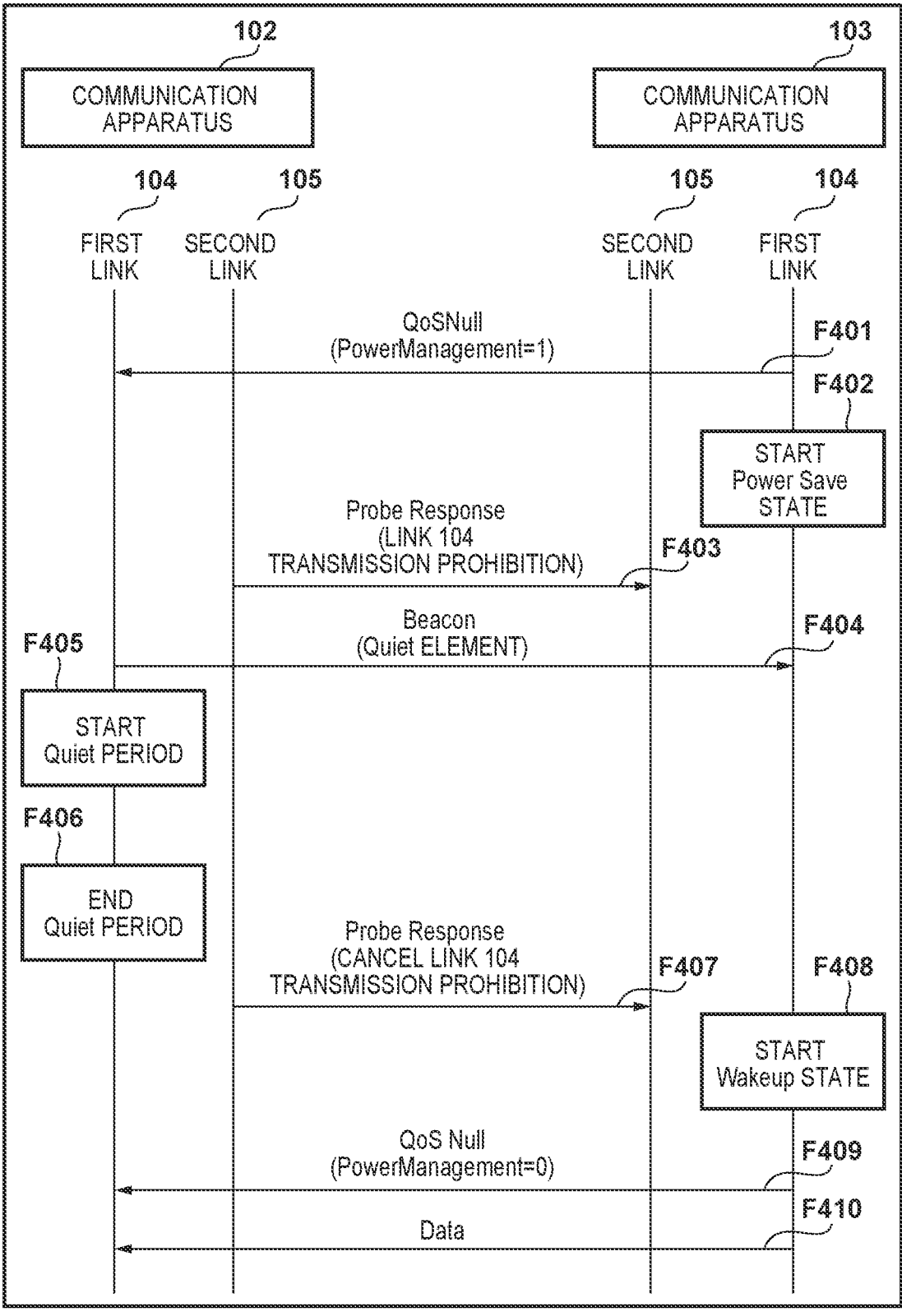

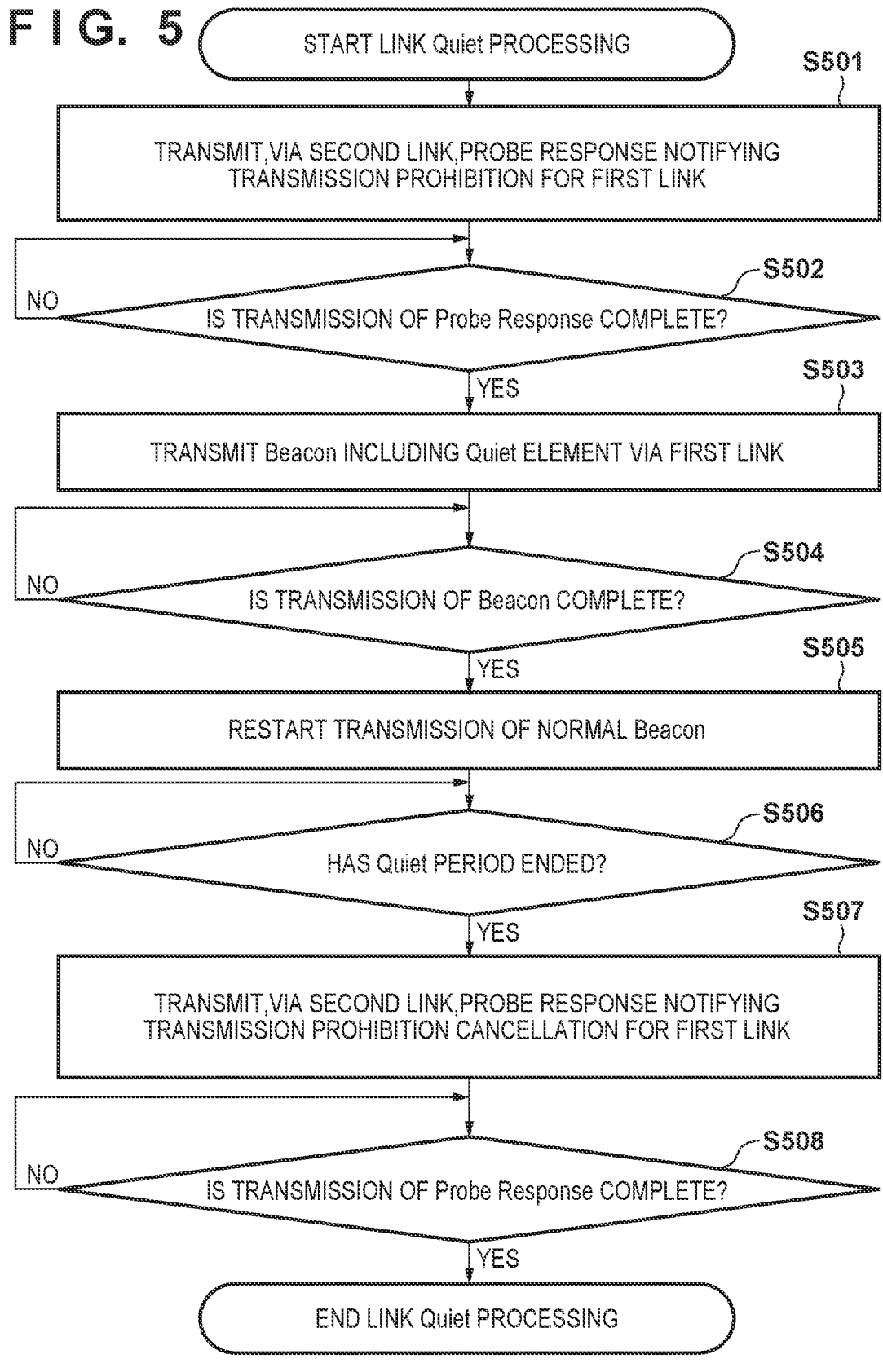

F I G. 5

START LINK Quiet PROCESSING

S501

TRANSMIT, VIA SECOND LINK, PROBE RESPONSE NOTIFYING TRANSMISSION PROHIBITION FOR FIRST LINK

S502

IS TRANSMISSION OF Probe Response COMPLETE?

NO

YES

S503

TRANSMIT Beacon INCLUDING Quiet ELEMENT VIA FIRST LINK

S504

IS TRANSMISSION OF Beacon COMPLETE?

NO

YES

S505

RESTART TRANSMISSION OF NORMAL Beacon

S506

HAS Quiet PERIOD ENDED?

NO

YES

S507

TRANSMIT, VIA SECOND LINK, PROBE RESPONSE NOTIFYING TRANSMISSION PROHIBITION CANCELLATION FOR FIRST LINK

S508

IS TRANSMISSION OF Probe Response COMPLETE?

NO

YES

END LINK Quiet PROCESSING

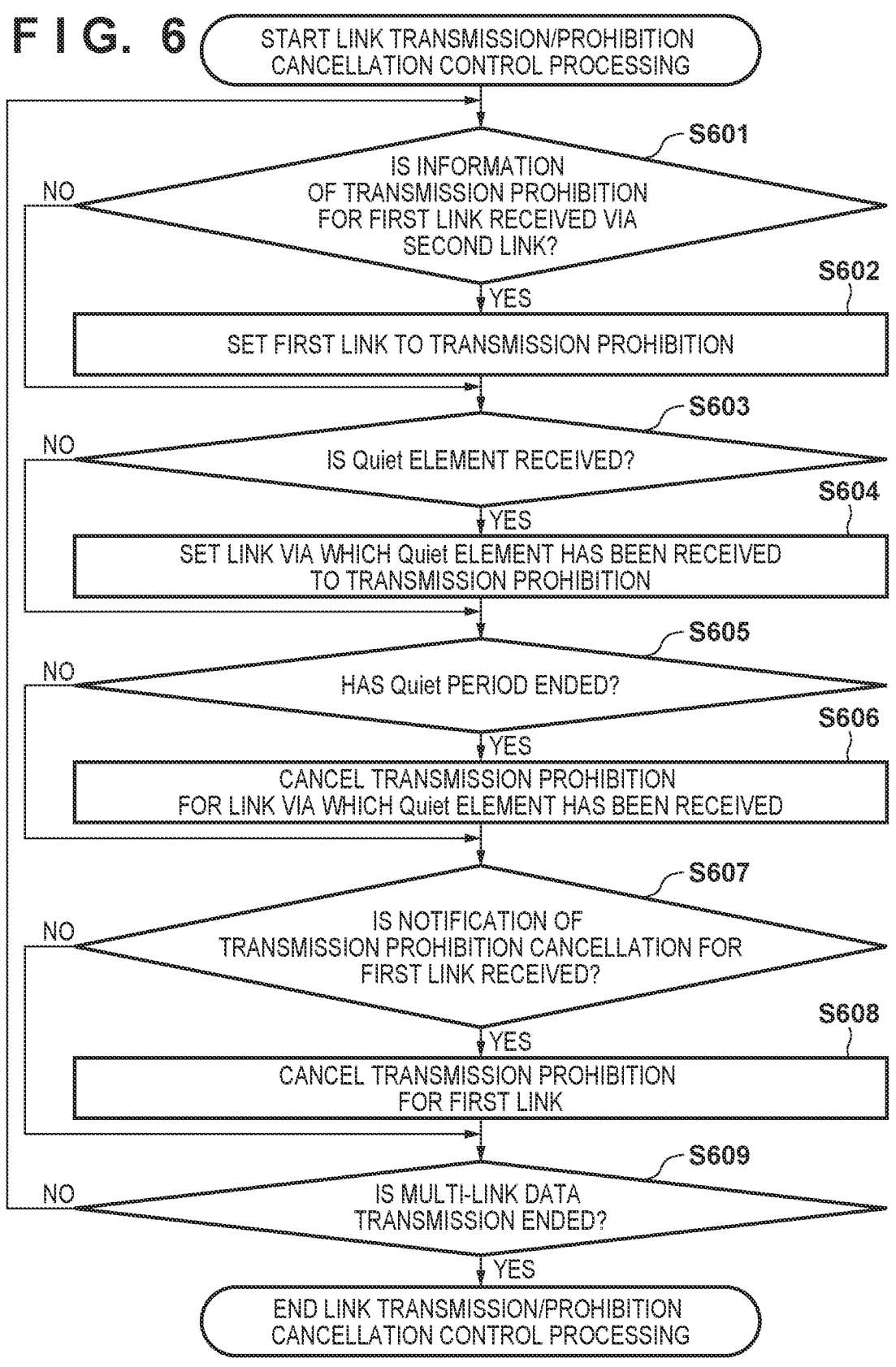
F I G. 6

COMMUNICATION APPARATUS, CONTROL METHOD FOR COMMUNICATION APPARATUS, AND STORAGE MEDIUM

CROSS-REFERENCE TO RELATED APPLICATIONS

This application is a Continuation of International Patent Application No. PCT/JP2021/041121, filed Nov. 9, 2021, which claims the benefit of Japanese Patent Application No. 2021-014558, filed Feb. 1, 2021, both of which are hereby incorporated by reference herein in their entireties.

BACKGROUND OF THE INVENTION

Field of the Invention

The present invention relates to a Multi-Link communication technique

Background Art

The IEEE 802.11 series is a known series of standards for wireless LAN (Local Area Network) communication established by the IEEE (Institute of Electrical and Electronics Engineers). The IEEE 802.11 series of standards are standards such as IEEE 802.11a/b/g/n/ac/ax and the like. In PTL1, a link being established in a case where an AP (Access Point) and a STA (Station) communicate is described.

In the IEEE, in order to further enhance the throughput and the frequency utilization, study into the establishment of a new IEEE 802.11 series standard, IEEE 802.11be, has been made. The study includes using the IEEE 802.11be standard for Multi-Link communication in which a single AP establishes a plurality of links with a single Non-AP (Non-Access Point) STA (simply referred to as STA) via a plurality of different frequency channels for communication. This kind of AP is referred to as an AP MLD (Access Point Multi-Link Device), and the STA is referred to as a Non-AP MLD (Non-Access Point Multi-Link Device).

With the IEEE 802.11 series of standards, an AP can transmit a Beacon frame or a Probe Response frame including a Quiet element including information such as a time period in which a link is in a Quiet (transmission by communication partner apparatus prohibited) state or the like. In a case where the STA receives this frame, a Quiet state is maintained, or in other words the STA does not transmit, in the time period indicated by the Quiet element. In this time period, the AP can execute radar wave measurement for DFS (Dynamic Frequency Selection), noise measurement, and the like, without being affected by transmission signals from the STA.

However, with Multi-Link communication, even if the AP MLD transmits, via a link, a frame including a Quiet element to make the link Quiet, the Non-AP MLD is not guaranteed to receive the Quiet element. This is because the link may be in a Doze state for power saving for the Non-AP MLD or the signal transmitted via the link may receive interference from a signal being transmitted via another link by the Non-AP MLD. In a case where the Quiet element cannot be received, the Non-AP MLD may transmit a signal via the link which is meant to be Quiet. This may cause the radar wave measurement, the noise measurement, and the like to be unable to be appropriately performed by the AP MLD.

CITATION LIST

Patent Literature

PTL1: Japanese Patent Laid-Open No. 2012-523202

SUMMARY OF THE INVENTION

The present invention has been made in consideration of the foregoing and provides techniques for performing appropriate link management in Multi-Link communication.

A communication apparatus according to one aspect of the present invention is a communication apparatus capable of multiple link communication compliant with an IEEE 802.11 series standard, comprising: a decision unit configured to decide a first link, from among a plurality of links established with a communication partner apparatus, which is to be a link with prohibited transmission by the communication partner apparatus, and a transmission prohibition period for the first link; a first transmission unit configured to transmit, using the first link, a first frame including information relating to transmission prohibition for the first link; and a second transmission unit configured to transmit, using a second link different from the first link among the plurality of links, a second frame including information relating to transmission prohibition for the first link, before the transmission prohibition period starts.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a diagram illustrating an example of the configuration of a network.

FIG. 4 is a sequence diagram illustrating an example of processing including processing by a communication apparatus 102 to make a link Quiet.

FIG. 5 is a flowchart illustrating processing executed in a case where the communication apparatus 102 makes a link Quiet.

FIG. 6 is a flowchart illustrating processing executed in a case where a communication apparatus 103 controls link transmission prohibition or prohibition cancellation.

DESCRIPTION OF THE EMBODIMENTS

Figure 2:
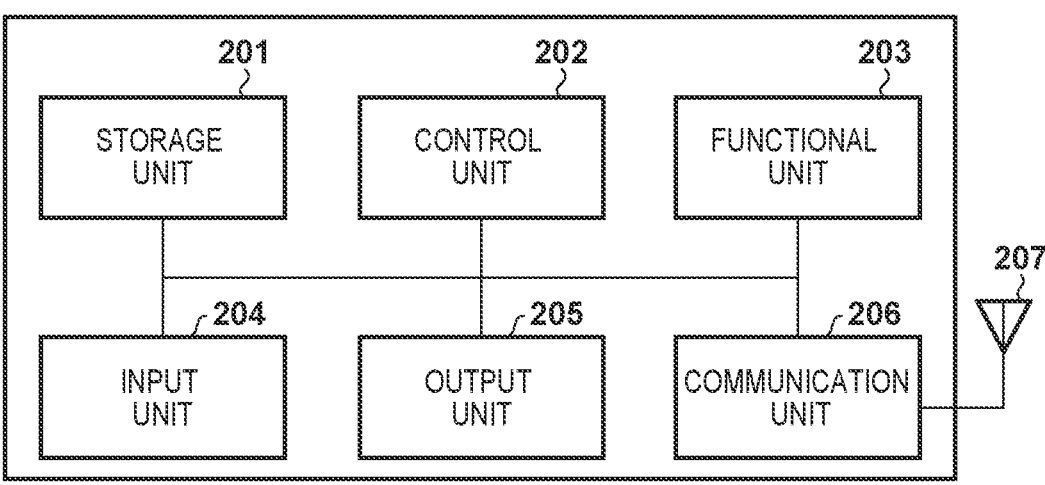
FIG. 2 is a diagram illustrating an example of the hardware configuration of a communication apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Network Configuration

FIG. 1 is a diagram illustrating an example of a network configuration according to the present embodiment. A communication apparatus 102 has the function of forming a network 101 and is an AP MLD (Access Point Multi-Link Device) capable of Multi-Link communication. The communication apparatus 102 is logically constituted of a plurality of APs, each able to form one or more links with an STA. Note that the network 101 is a wireless network formed by the communication apparatus 102. In the present embodiment, in a case where the communication apparatus 102 forms a plurality of networks, the BSSID (Basic Service Set Identifier) of each network may be the same or may be different. Note that the BSSID is an identifier for identifying a network. Also, the SSID (Service Set Identifier) indicated by the communication apparatus 102 for each network may be the same or may be different. Note that the SSID is an identifier for identifying an access point.

A communication apparatus 103 has the function of joining the network 101 and is a Non-AP MLD (Non-Access Point Multi-Link Device) capable of Multi-Link communication. The communication apparatus 103 is logically constituted of a plurality of STAs, each able to form one or more links with an AP.

Each communication apparatus supports the IEEE 802.11be (EHT (Extremely/Extreme High Throughput)) standard and can execute wireless communication compliant with the IEEE 802.11be standard via the network 101. Each communication apparatus can communicate at frequency bands including 2.4 GHz, 5 GHz, and 6 GHz. The frequency bands used by the communication apparatuses are not limited to these, and, for example, different frequency bands such as 60 GHz may be used. Also, each communication apparatus can use bandwidth of 20 MHz, 40 MHz, 80 MHz, 160 MHz, and 320 MHz for communication.

Also, each communication apparatus can execute OFDMA (Orthogonal Frequency Division Multiple Access) communication compliant with the IEEE 802.11be standard. The communication apparatus 102 can implement Multi-User (MU) communication in which the signals of multiple users are multiplexed by executing OFDMA communication. In OFDMA communication, a portion (RU (Resource Unit)) of the divided frequency band is allocated to each STA without overlap, and the carrier waves allocated to respective STAs are orthogonal to one another. Accordingly, the communication apparatus 102 can communicate in parallel with a plurality of STAs.

Also, the communication apparatuses execute Multi-Link communication by communicating with links established via the plurality of frequency channels. Here, frequency channel is a frequency channel defined by the IEEE 802.11 series of standards and indicates the frequency channel able to be used to perform wireless communication that complies with the IEEE 802.11 series of standards. In the IEEE 802.11 series of standards, a plurality of frequency channels are defined in each frequency band including 2.4 GHz, 5 GHz, and 6 GHz. Also, in the IEEE 802.11 series of standards, the bandwidth of each frequency channel is defined as 20 MHz. Note that with a single frequency channel, a bandwidth of 40 MHz or greater may be used via the channel bonding of adjacent frequency channels.

As illustrated in FIG. 1, for example, the communication apparatus 102 can establish, with the communication apparatus 103, a first link 104 via a first frequency channel of the 5 GHz band and a second link 105 via a second frequency channel of the 2.4 GHz band and performing communicating via both links. In this case, the communication apparatus 102 maintains the second link 105 via the second frequency channel in parallel with the first link 104 via the first frequency channel. In this manner, by the communication apparatus 102 establishing links via a plurality of frequency channels with the communication apparatus 103, the throughput of the communication with the communication apparatus 103 can be improved.

Note that in Multi-Link communication, the communication apparatus 102 and the communication apparatus 103 can establish a plurality of links of different frequency bands. For example, the communication apparatus 102 and the communication apparatus 103 may establish a third link (not illustrated) in the 6 GHz band in addition of the first link 104 in the 5 GHz band and the second link 105 in the 2.4 GHz band. Alternatively, the communication apparatus 102 and the communication apparatus 103 may establish a link via different channels included in the same frequency band. For example, the communication apparatus 102 and the communication apparatus 103 may establish the first link 104 via 1 ch in the 2.4 GHz band and the second link 105 via 5 ch in the 2.4 GHz band.

Also, links of the same frequency band and links with the same frequency band may coexist. For example, the communication apparatus 102 and the communication apparatus 103 may establish a third link (not illustrated) via 52 ch in the 5 GHz band in addition of the first link 104 via 1 ch in the 2.4 GHz band and the second link 105 via 5 ch in the 2.4 GHz band. By the communication apparatus 102 establishing a plurality of connections of different frequencies with the communication apparatus 103, in a case where a certain band is congested, another band can be used for communication. This allows a decrease in throughput in communication with the communication apparatus 103 to be prevented.

In a case where Multi-Link communication is performed, the communication apparatus 102 and the communication apparatus 103 can divide one piece of data and transmit the pieces of data to the communication partner apparatus via a plurality of links. Alternatively, by the communication apparatus 102 and the communication apparatus 103 transmitting the same data via each one of the plurality of links, the communication via one link can be used as a backup communication for the communication via another link. Specifically, it is assumed that the communication apparatus 102 transmits the same data to the communication apparatus 103 via the first link 104 using the first frequency channel and the second link 105 using the second frequency channel. In this case, even if there is an error in the communication via the first link 104, for example, since the same data is being transmitted via the second link 105, the communication apparatus 103 can receive the data transmitted from the communication apparatus 102.

Alternatively, in a case of performing Multi-Link communication, the communication apparatus 102 and the communication apparatus 103 may selectively use links depending on the type of frame or the type of data being communicated. For example, the communication apparatus 102 may transmit a management frame compliant with the IEEE 802.11 series of standards via the second link 105 and may transmit a data frame including data via the first link 104. Naturally, a management frame may be transmitted and received using the first link 104 and the second link 105. Note that a management frame is a MAC (Media Access Control) frame and specifically includes a Beacon frame, a Probe Request frame/Response frame, an Association Request frame/Response frame. In addition to these frames, a Disassociation frame, an Authentication frame, a De- Authentication frame, an Action frame, and the like are also referred to as a management frame.

A Beacon frame is a frame for communicating network information. A Probe Request frame is a frame for requesting network information, and a Probe Response frame is a frame for providing network information as a response. An Association Request frame is a frame for requesting a connection, and an Association Response frame is a frame indicating connection allowance or an error as a response. A Disassociation frame is a frame for disconnecting a connection. An Authentication frame is a frame for authenticating a communication partner apparatus, and a De-Authentication frame is a frame for interrupting the authentication of a communication partner apparatus and disconnecting a connection. An Action frame is a frame for performing any function in addition to those described above.

Also, in a case where the communication apparatus 102 transmits data relating to a captured image, for example, the communication apparatus 102 may transmit meta information, such as the date, the image capture parameters (f-number and shutter speed), and position information, via the second link 105 and may transmit pixel information via the first link 104.

Also, the communication apparatus 102 and the communication apparatus 103 may be able to execute MIMO (Multiple-Input Multiple-Output) communication. In this case, the communication apparatus 102 and the communication apparatus 103 include a plurality of antennas, with different signals being sent from the antennas using the same frequency channel. The receiving side simultaneously receives all of the signals that arrived from the plurality of streams using the antennas, separates the signals of the streams, and decodes them. In this manner, by performing MIMO communication, the communication apparatus 102 and the communication apparatus 103 can communicate a larger amount of data in the same amount of time compared to a case where MIMO communication is not executed. Also, the communication apparatus 102 and the communication apparatus 103, in a case where Multi-Link communication is performed, may execute MIMO communication using one or more links.

In the present embodiment, in a case where a link for Multi-Link communication is established, the communication apparatus 102 and the communication apparatus 103 each retain the information relating to operations of the established link. Information relating to the operations of a link includes the number of spatial streams used in MIMO communication, communication bandwidth, and the like. The parameters relating to such operations are decided in a case where the communication apparatus 102 and the communication apparatus 103 establish a link, but this may be changed to after a link is established. For example, in a case where the frequency channels adjacent to the frequency channel used by the link are congested, a change may be made to narrow the bandwidth. Alternatively, in a case where the frequency channel used by the link is congested, the MIMO communication being executed may be ended. In this manner, in a case where the parameters for the operations of the Multi-Link communication are changed, the communication apparatus 102 and the communication apparatus 103 need to quickly share the new operation parameters.

Note that the communication apparatus 102 and the communication apparatus 103 support the IEEE 802.11be standard, but may also support at least one of the legacy standards prior to the IEEE 802.11be standard. Legacy standards refers to the IEEE 802.11a/b/g/n/ac/ax standards.

Note that in the present embodiment, at least one of the IEEE 802.11a/b/g/n/ac/ax be standards is referred to as an IEEE 802.11 series standard. Also, in addition to the IEEE 802.11 series standard, other standards, such as Bluetooth (registered trademark), NFC (Near Field Communication), UWB (Ultra Wide Band), Zigbee, MBOA (Multi Band OFDM Alliance), and the like may be supported. UWB includes wireless USB, wireless 1394, WiNET, and the like. Also, wired communication standards such as wired LAN may be supported.

Specific examples of the communication apparatus 102 (AP MLD) include, but are not limited to, a wireless LAN router, a PC, and the like. It is sufficient that the communication apparatus 102 is a communication apparatus that can execute Multi-Link communication with another communication apparatus. Also, the communication apparatus 102 may be an information processing apparatus such as a radio chip capable of performing wireless communication that complies with the IEEE 802.11be standard. Also, specific examples of the communication apparatus 103 (Non-AP MLD) include, but are not limited to, a camera, a tablet, a smartphone, a PC, a mobile phone, a video camera, and the like. It is sufficient that the communication apparatus 103 is a communication apparatus that can execute Multi-Link communication with another communication apparatus. Also, the communication apparatus 103 may be an information processing apparatus such as a radio chip that can execute wireless communication that complies with the IEEE 802.11be standard. Furthermore, the network in FIG. 1 is a network constituted of a single AP MLD and a single Non-AP MLD, but the number of AP MLDs and Non-AP MLDs is not limited to this number. Note that an information processing apparatus such as a radio chip may include an antenna for transmitting a generated signal.

Note that in the present embodiment, as illustrated in FIG. 1, the communication apparatus 102 is the AP MLD and the communication apparatus 103 is the Non-AP MLD. However, no such limitation is intended, and the communication apparatus 102 and the communication apparatus 103 may both be Non-AP MLDs. In this case, the communication apparatus 102 is a Non-AP MLD, but may operate as an apparatus that has the function of forming a wireless network for establishing a link with the communication apparatus 103.

Communication Apparatus Configuration

The configuration of the communication apparatus according to the present embodiment will now be described. FIG. 2 is a diagram illustrating an example of the hardware configuration of the communication apparatus 102. Note that the communication apparatus 103 has a similar hardware configuration. The communication apparatus 102, as an example of the hardware configuration, includes a storage unit 201, a control unit 202, a functional unit 203, an input unit 204, an output unit 205, a communication unit 206, and an antenna 207.

The storage unit 201 is constituted by one or more memories such as a ROM (read only memory) or a RAM (random access memory), and stores computer programs for executing various operations described below and stores various pieces of information such as communication parameters for wireless communication. Note that, other than a memory such as a ROM or RAM, a storage medium such as a flexible disk, a hard disk, an optical disk, a magneto-optical disk, a CD-ROM, a CD-R, a magnetic tape, a non-volatile memory card, a DVD, or the like, may be used as the storage unit 201. Also, the storage unit 201 may be provided with a plurality of memories, or the like.

The control unit 202, for example, is constituted by one or more processors, such as a CPU (central processing unit), an MPU (micro processing unit), or the like, and controls the entire communication apparatus 102 by executing computer programs stored in the storage unit 201. Note that the control unit 202 may control the entire communication apparatus 102 via cooperation of the computer program stored on the storage unit 201 and an OS (operating system). Also, the control unit 202 generates data and signals (radio frame) for transmission via communication with other communication apparatuses (see FIG. 3). Also, the control unit 202 may be provided with a plurality of processors such as a multicore processor and control the entire communication apparatus 102 via the plurality of processors. Also, the control unit 202 controls the functional unit 203 and executes predetermined processing, such as wireless communication, image capture, printing, projecting, and the like. The functional unit 203 is hardware for the communication apparatus 102 to execute predetermined processing.

The input unit 204 receives various operations from a user. The output unit 205 outputs to a user via a monitor screen or a speaker, for example. In this example, output via the output unit 205 may correspond to displaying on a monitor screen, outputting audio via a speaker, outputting vibrations, and the like. Note that the input unit 204 and the output unit 205 may be implemented as a single module via a touch panel, for example. Also, the input unit 204 and the output unit 205 may be integrally formed with the communication apparatus 102 or may be separately formed.

The communication unit 206 performs control of wireless communication that complies with the IEEE 802.11be standard. Also, the communication unit 206 may perform control of wireless communication that complies with another IEEE 802.11 series standard in addition to the IEEE 802.11be standard and may perform control of wired communication using a wired LAN or the like. The communication unit 206 controls the antenna 207 and transmits and receives signals for wireless communication generated by the control unit 202. The communication apparatus 102 may include a plurality of communication units 206. In the case of the communication apparatus 102 including a plurality of communication units 206, in a case where a plurality of links are established in Multi-Link communication, at least one link is established for each communication unit 206. Alternatively, the communication apparatus 102 may establish a plurality of links using one communication unit 206. In this case, by switching the frequency channel in operation on the basis of time divisions, the communication unit 206 executes communication via a plurality of links. Note that in a case where the communication apparatus 102, in addition to the IEEE 802.11be standard, supports an NFC standard, Bluetooth standard, or the like, the communication apparatus 102 may perform control of wireless communication compliant with these communication standards. Also, in a case where the communication apparatus 102 can execute wireless communication that complies with a plurality of communication standards, a configuration may be used in which the communication unit that supports the communication standards and the antennas are provided separate. The communication apparatus 102 communicates data, such as image data, document data, video data, and the like, with the communication apparatus 103 via the communication unit 206. Note that the antenna 207 may be separately formed from the communication unit 206 or may be formed as a single module together with the communication unit 206.

The antenna 207 is an antenna that can communicate at a frequency band including 2.4 GHz, 5 GHz, and 6 GHz. In the present embodiment, the communication apparatus 102 includes one antenna, but different antennas may be provided for each frequency band. Furthermore, in a case where the communication apparatus 102 includes a plurality of antennas, the communication unit 206 may be provided corresponding to each antenna.

Figure 3:
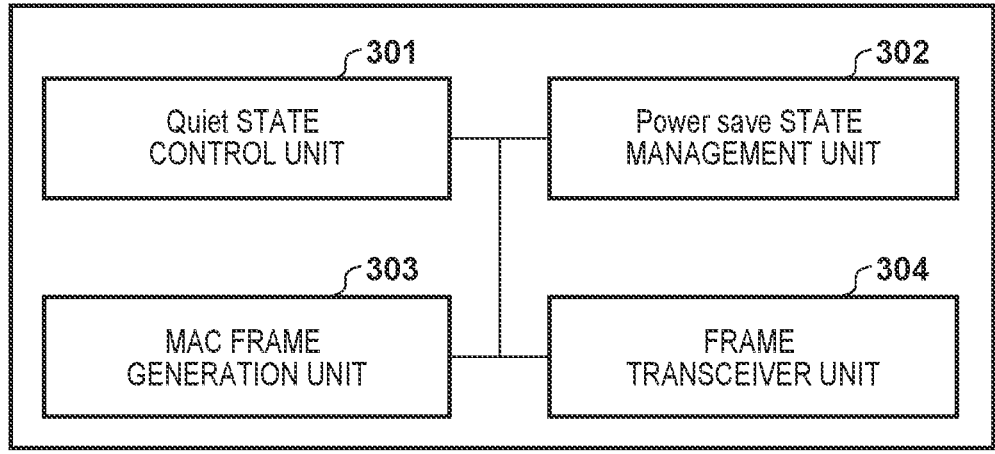
FIG. 3 is a diagram illustrating an example of the functional configuration of a communication apparatus.

FIG. 3 is a diagram illustrating an example of the functional configuration of the communication apparatus 102. Note that the communication apparatus 103 has a similar functional configuration (in the case of the communication apparatus 103, the communication partner apparatus in the following description of FIG. 3 is the communication apparatus 102). The communication apparatus 102, as an example of the functional configuration, includes a Quiet state control unit 301, a Power Save state management unit 302, a MAC frame generation unit 303, and a frame transceiver unit 304.

The Quiet state control unit 301 decides to make one of the links of the Multi-Link established with the communication partner apparatus (communication apparatus 103) Quiet in order for the communication apparatus 102 to execute radar waves measurement, noise measurement, and the like for DFS (Dynamic Frequency Selection). One or more links can be made Quiet, but in this example, one is made Quiet. The Quiet state control unit 301 can also decide the time period (time period (Quiet period) for prohibiting transmission by the communication partner apparatus) for which the link is put in a Quiet state. The Quiet state control unit 301 may decide a Quiet period and/or the link to put in the Quiet period, on the basis of a user instruction. Also, the Quiet period may be a predetermined periodic time period.

In a case where the Quiet state control unit 301 decides a link which is to be made Quiet, the frame transceiver unit 304 described below notifies, via a different link from the link which is to be made Quiet, that transmission via the link is prohibited. In the configuration in FIG. 1, for example, the Quiet state control unit 301 decides to make the first link 104 Quiet, and the frame transceiver unit 304 can notify (send a request to) the communication partner apparatus via the second link 105 of the prohibition of transmission via the first link 104.

The Power Save state management unit 302 manages whether or not to put one of the links of the Multi-Link established with the communication partner apparatus (communication apparatus 103) in a Power Save state. One or more links can be put in the Power Save state, but in this example, one is put in the Power Save state. Putting a link in the Power Save state refers to transitioning the link to a state in which communication using a link targeted for Power Save is not performed. Here, not performing communication means not communicating data frames. In addition, in the link targeted for Power Save, management frames may not be communicated, and/or the link is transitioned to a Doze state and reception may not be performed.

In a case where the communication apparatus 102 includes the communication unit 206 for each link, the control unit 202 may temporarily stop or decrease the supply of power to the communication unit 206 corresponding to the link to be transitioned to a Power Save state. In the present embodiment, opposing to the Power Save state, a state in which a link is used for communication is referred to as the Wakeup state. In a case where the communication unit 206 is provided for each link, the power to be supplied to the communication unit 206 corresponding to a link in the Power Save state is less than the power to be supplied to the communication unit 206 corresponding to a link in the Wakeup state. Also, the communication unit 206 corresponding to a link in the Power Save state consumes less power than the communication unit 206 corresponding to a link in the Wakeup state.

The Power Save state management unit 302 may put, in the Power Save state or in the Wakeup state, a link indicated in a MAC frame indicating Power Save state, received by the frame transceiver unit 304 from the communication partner apparatus (communication apparatus 103). Alternatively, the Power Save state management unit 302 may put a link in the Power Save state or the Wakeup state according to an instruction from a user received via the input unit 204 or the like.

Also, the Power Save state management unit 302 may put a link in the Power Save state or the Wakeup state on the basis of the state of data communication with the communication partner apparatus (communication apparatus 103) via the frame transceiver unit 304. For example, in a case where the amount of data to be transmitted to the communication apparatus 103 is less than a predetermined threshold, the Power Save state management unit 302 may transition one or more of the links of the plurality of links established with the communication apparatus 103 to the Power Save state. On the other hand, in a case where the amount of data to be transmitted to the communication apparatus 103 is greater than a predetermined threshold, the Power Save state management unit 302 may transition, to the Wakeup state, the links with the communication apparatus 103 which is in the Power Save state. Alternatively, the Power Save state management unit 302 may transition, to the Wakeup state, links other than those with the communication apparatus 103 which is in the Power Save state on the basis of a decrease in the throughput of the links used in data communication with the communication apparatus 103. In this case, the Power Save state management unit 302 may transition the links originally used in the data communication from the Wakeup state to the Power Save state.

The MAC frame generation unit 303 generates MAC (Media Access Control) frames. The MAC frames generated by the MAC frame generation unit 303 include various types of management frames, such as a Beacon, Probe Response, FILS (Fast Initial Link Setup), Discovery, and the like. In a case where the Quiet state control unit 301 decides to make the first link 104 Quiet, the MAC frame generation unit 303 generates a Beacon or a Probe Response frame including a Quiet element, to be transmitted via the first link 104. The Quiet element may include information similar to the "transmission prohibition period" as described above as information relating to the time period (Quiet period) in which the target link is put in the Quiet state.

The MAC frame generation unit 303 further generates a Beacon, a Probe Response, or a FILS Discovery including the information for notifying via the second link 105 that transmission via the first link 104 is prohibited. Information for notifying that transmission via the target link is prohibited is referred to below as "transmission prohibition information".

The transmission prohibition information may include information for identifying a link to be prohibited from transmitting. Also, the transmission prohibition information may include information indicating whether a link is prohibited from transmitting or whether transmission prohibition has been canceled. The information on transmission prohibition/transmission prohibition cancellation may be constituted of 1 bit, and in this case, a value of 0 may indicate that transmission is not prohibited and a value of 1 may indicate that transmission prohibition has been canceled. This bit is referred to below as the "transmission prohibition bit". By including the transmission prohibition bit in the transmission prohibition information, the MAC frame generation unit 303 can generate a frame for notifying the link state based on simple processing. Also, the receiving side of the MAC frame can determine the link state from the received frame based on simple processing.

Also, the transmission prohibition information may include information indicating the time period in which transmission is prohibited. This time period is referred to below as the "transmission prohibition period". The transmission prohibition period may be represented by three pieces of information using, as a reference, the Target Beacon Transmission Time (TBTT) indicating the transmission timing of the Beacon frame. The three pieces of information are 1) Quiet Count, 2) Quiet Offset, and 3) Quiet Duration. 1) Quiet Count is the number of TBTTs until the Beacon Interval in which the transmission prohibition period starts. 2) Quiet Offset is an offset from the TBTT specified by the Quiet Count to the start of the transmission prohibition period. 3) Quiet Duration is the duration of the transmission prohibition period. 2) Quiet Offset and 3) Quiet Duration may be represented using, as the unit, TU (Time Unit) defined in the IEEE 802.11 series standard.

The TBTT acting as a reference may be the TBTT associated with the first link 104. In this case, the three pieces of information can use the information of the same fields included in the Quiet element.

Alternatively, the TBTT acting as a reference may be the TBTT associated with the second link 105. In this case, the values of the 1) Quiet Count and 2) Quiet Offset correspond to values representing the start time of the Quiet period for the first link 104 using the TBTT for the link 104 as a reference. By using, as the TBTT for the second link 105, the TBTT acting as a reference, even if, for a long time period at the first link 104, the state is a Doze state, a Beacon frame cannot be received, and the TBTT cannot be known, the communication apparatus 102 can accurately be aware of the transmission prohibition period.

In a case where the transmission prohibition information includes the transmission prohibition bit but does not include the transmission prohibition period, the communication band can be efficiently used by shortening the length of the frame including the transmission prohibition information. Also, in a case where the transmission prohibition information includes the transmission prohibition period, the communication band can be efficiently used because a frame including the transmission prohibition information indicating that the transmission prohibition is canceled may not be transmitted.

Note that the MAC frame generation unit 303 may generate a data frame or the like in addition to or instead of the management frame.

The frame transceiver unit 304 performs, via the communication unit 206 and the antenna 207, transmission of a radio frame including the MAC frame generated by the MAC frame generation unit 303, and reception of a radio frame from the communication partner apparatus (communication apparatus 103). The frame transceiver unit 304 can further control frame communication. For example, the frame transceiver unit 304 can control the stopping (prohibiting) of frame transmission during a predetermined time period (Quiet period, transmission prohibition period).

Flow of Processing by Communication Apparatus 102 and Communication Apparatus 103

Next, the processing to make a link Quiet, executed by the communication apparatuses according to the present embodiment will be described. FIG. 4 is a sequence diagram illustrating an example of processing including processing by the communication apparatus 102 to make the first link 104 Quiet. In the present embodiment, the communication apparatus 102 and the communication apparatus 103 establish two links (first link 104 and second link 105) to execute Multi-Link communication. The first link 104 is a link using the first frequency channel (for example, 52 ch in the 5 GHz band), and the second link 105 is a link using the second frequency channel (for example, 1 ch in the 2.4 GHz band). The processing of the present sequence may be started after the links are established via Multi-Link Setup processing.

In F401, the communication apparatus 103 transmits a QoS Null frame with the Power Management bit set to 1, to the communication apparatus 102 via the first link 104. In this manner, the communication apparatus 103 notifies the communication apparatus 102 that the first link 104 will be transitioned to the Power Save state. Subsequently, in F402, the communication apparatus 103 transitions the first link 104 to the Power Save state. At this time, in the present embodiment, the communication apparatus 103 transitions the first link 104 to a Doze state in which communication is not possible including the receiving of frames and signals.

Note that in the present embodiment, the communication apparatus 103 transitions the link (first link 104) via which the QoS Null frame has been received to the Power Save state. However, no such limitation is intended. For example, the communication apparatus 103 may transition the first link 104 to the Power Save state after transmitting via the second link 105a QoS Null frame including information indicating the first link 104. In this case, the communication apparatus 103 does not transition the second link 105 via which the QoS Null frame has been transmitted to the Power Save state. Note that the communication apparatus 103 can include, as the information indicating the first link 104, an identifier that enables the first link 104 to be identified from other links in the QoS Null frame. In addition or alternatively, the communication apparatus 103 may include information indicating the BSSID of the wireless network in which the first link 104 has been formed, in the QoS Null frame, or may include information indicating the first frequency channel.

Subsequently, in F403, the communication apparatus 102 transmits a Probe Response frame including the transmission prohibition information for notifying transmission prohibition for first link 104 to the communication apparatus 103 via the second link 105. Here, the destination for the Probe Response frame may be only the communication apparatus 103 or may be a group of a plurality of STAs or Non-AP MLDs. Alternatively, the frame may be transmitted via broadcast. Also, as described above, instead of a Probe Response frame, a Beacon frame may be transmitted. The transmission prohibition information may include information such as information for identifying the link to prohibit transmission, the transmission prohibition bit, transmission prohibition period, and the like.

After transmission of the Probe Response frame, in F404, the communication apparatus 102 transmits, via the first link 104, a Beacon frame including a Quiet element for making the first link 104 Quiet. Note that it is sufficient that the Probe Response frame including the transmission prohibition information is transmitted (F403) before the Quiet period starts. In other words, the transmission (F403) of the Probe Response frame including the transmission prohibition information may be before, after, or at the same time as the transmission (F404) of the Beacon frame including the Quiet element. In a case where the Beacon frame is transmitted in F404, the communication apparatus 102 makes the first link 104 Quiet for the time period (Quiet period) from F405 to F406 on the basis of the contents of the Quiet element included in the frame. The communication apparatus 102 may transmit a Beacon frame not including a Quiet element during the Quiet period. Note that depending on conditions, transmission (F403) of a Probe Response frame including the transmission prohibition information may be permitted to be after the Quiet period starts.

On the other hand, the communication apparatus 103, since it is in the Doze state, cannot receive the Beacon frame (F404) including the Quiet element transmitted from the communication apparatus 102. However, the communication apparatus 103 has received the Probe Response frame (F403) including the transmission prohibition information via the second link 105 and thus can be aware of the Quiet period (transmission prohibition period). Thus, the communication apparatus 103 does not transition the first link 104 to the Wakeup state and transmit data via this link even in a case where there is data to be transmitted during the Quiet period.

In F407, after the Quiet period has elapsed (in a case where the time period has ended), the communication apparatus 102 transmits a Probe Response frame including the transmission prohibition information indicating that the first link 104 transmission prohibition is canceled, to the communication apparatus 103 via the second link 105. Here, the destination for the Probe Response frame may be only the communication apparatus 103 or may be a group of a plurality of STAs or Non-AP MLDs. Alternatively, the frame may be transmitted via broadcast. Note that in a case where the Probe Response frame transmitted in F403 include information indicating the transmission prohibition period, the Probe Response frame of F407 may not be transmitted.

In a case where the Probe Response frame of F407 is received, in F408, the communication apparatus 103 cancels the Power Save state of the first link 104 and transitions the link to the Wakeup state. In this manner, the communication apparatus 103 transitions the first link 104 from a state in which communication cannot be executed to a state in which communication can be executed. Note that in a case where the Probe Response frame received in F403 includes information indicating the transmission prohibition period for the first link 104, the communication apparatus 103 may transition the link to the Wakeup state after the end of the transmission prohibition period indicated in the frame.

In a case where the communication apparatus 103 transitions the first link 104 to the Wakeup state, in F409, the communication apparatus 103 transmits a QoS Null frame with the Power Management bit set to 0, to the communication apparatus 102. In this manner, the communication apparatus 103 can notify the communication apparatus 102 that the first link 104 has transitioned to the Wakeup state. Note that the QoS Null frame may not be transmitted. Subsequently, in F410, the communication apparatus 103 executes transmission of a data frame via the first link 104 in the Wakeup state.

In this manner, before the quiet period of the first link 104 starts, the communication apparatus 102 transmits a frame including the transmission prohibition information for prohibiting transmission using the link to the communication apparatus 103. Accordingly, in a case where the first link 104 is in the Doze state, at least in the Quiet period, the communication apparatus 103 can prevent the link from being put in the Wakeup to transmit frames and signals.

Processing by Communication Apparatus 102

FIG. 5 is a flowchart illustrating the processing executed by the control unit 202 reading out and executing a computer program stored in the storage unit 201 in a case where the communication apparatus 102 makes a link Quiet. The processing of the present flowchart may be started after a Multi-Link formed by the first link 104 and the second link 105 is established by Multi-Link Setup processing by the communication apparatus 102 and the communication apparatus 102 has decided to make one link Quiet. In the example in FIG. 5, as in the example in FIG. 4, the communication apparatus 102 decides to make the first link 104 Quiet (transmission by communication partner apparatus prohibited).

Then MAC frame generation unit 303 of the communication apparatus 102 generates a Probe Response frame including the transmission prohibition information for notifying transmission prohibition for the first link 104 (link to be made Quiet). Then, the frame transceiver unit 304 of the communication apparatus 102 transmits the Probe Response frame using the second link 105, which is a different link from the link to be made Quiet, to the communication apparatus 103 and waits for the completion of the transmission (steps S501 to S502).

In a case where the transmission of the Probe Response frame is complete (Yes in step S502), the MAC frame generation unit 303 of the communication apparatus 102 generates a Beacon frame including a Quiet element. Then, the frame transceiver unit 304 of the communication apparatus 102 transmits the Beacon frame using the first link 104, which is the link to be made Quiet, and waits for the completion of the transmission (steps S503 to S504).

In a case where the transmission of the Beacon frame is complete (Yes in step S504), the communication apparatus 102 restarts the transmission of a normal Beacon frame (step S505). In other words, the MAC frame generation unit 303 of the communication apparatus 102 generates a Beacon frame not including a Quiet element, and the frame transceiver unit 304 continues to transmit the Beacon frame.

Note that in steps S503 to Step S504, the communication apparatus 102, while updating the Quiet period (for example, while updating the value of the Quiet count) until the Quiet period starts, may continue to transmit a Beacon frame including a Quiet element. In other words, the communication apparatus 102 may continue to transmit a Beacon frame including a Quiet element that includes a Quiet period (value of the Quiet Count) updated according to the amount of time, until the Quiet period starts. Then, after the communication apparatus 102 transmits the last Beacon frame to be transmitted before the start of the Quiet period, the processing of step S505 may be executed.

In step S506, the Quiet state control unit 301 of the communication apparatus 102 waits until the end of the Quiet period of the first link 104. In a case where the Quiet period has ended (Yes in step S506), in step S507, the MAC frame generation unit 303 of the communication apparatus 102 generates a Probe Response frame including the transmission prohibition information for notifying the cancellation of the transmission prohibition for the first link 104. Then, the frame transceiver unit 304 transmits the Probe Response frame to the communication apparatus 103 using the second link 105 and waits for completion (steps S507 to S508). In a case where the transmission of the Probe Response frame is complete (Yes in step S508), the communication apparatus 102 ends the processing.

Note that the destination of the Probe Response frame (steps S501 and S507) including the transmission prohibition information may be only the communication apparatus 103 or may be a group of a plurality of STAs or Non-AP MLDs. Alternatively, the frame may be transmitted via broadcast. Also, the Probe Response frame may not be transmitted to a STA or a Non-AP MLD with the first link 104 in the Wakeup state, or with the first link 104 in a state in which a Quiet element can be received even though the first link 104 is in the Power Save state. In this case, the processing from steps S501 to S502 and from steps S507 to S508 may be skipped.

Also, in the example in FIG. 5, the communication apparatus 102 transmits (steps S501 to S502) the Probe Response frame for notifying transmission prohibition before the Beacon frame including the Quiet element is transmitted (steps S503 to S504). Alternatively, if it is before the start of the Quiet period, the Probe Response frame may be transmitted at the same time or after the Beacon frame including the Quiet element.

Processing by Communication Apparatus 103

FIG. 6 is a flowchart illustrating the processing executed by the control unit 202 reading out and executing a computer program stored in the storage unit 201 in a case where the communication apparatus 103 performs control to prohibit transmission via a link or cancel that transmission prohibition. The present flowchart may be started after a Multi-Link formed by the first link 104 and the second link 105 is established by Multi-Link Setup processing by the communication apparatus 103. In the example in FIG. 6, as in the example in FIG. 4, the communication apparatus 102 decides to make the first link 104 Quiet (transmission by communication partner apparatus prohibited).

In a case where the Probe Response frame including the transmission prohibition information indicating transmission prohibition for the first link 104 is received by the frame transceiver unit 304 of the communication apparatus 103 (Yes in step S601), the frame transceiver unit 304 determines that the first link 104 is in a transmission prohibited state. In this example, the Probe Response frame is received via the second link 105, which is a different link from the link to be made Quiet. Then, the frame transceiver unit 304 performs setting (control) so that frames are not transmitted using the first link 104 until the transmission prohibited state is canceled. In a case where the received transmission prohibition information includes the transmission prohibition period information, the frame transceiver unit 304 may perform setting so that frames are not transmitted in only that time period. In a case where a Probe Response frame including the transmission prohibition information is not received (No in step S601), the processing of step S602 is skipped.

Subsequently, in a case where the Beacon frame including the Quiet element is received by the frame transceiver unit 304 of the communication apparatus 103 (Yes in step S603), the frame transceiver unit 304 determines that the link via which the frame has been received is in a transmission prohibited state for the Quiet period indicated by the Quiet element. In the present example, the link via which the Quiet element has been received is the first link 104. Then, the frame transceiver unit 304 performs setting (control) so that frames are not transmitted using the first link 104, which is the link via which the Quiet element has been received, for the time period (step S604). In this example, in a case where the Quiet element is not received by the Power Save state management unit 302 due to the first link 104 being in the Doze state or the like (No in step S603), the processing of step S604 is skipped.

Subsequently, the frame transceiver unit 304 of the communication apparatus 103 stops the transmission of frames using the first link 104, which is the link via which the Quiet element has been received, for the Quiet period indicated by the Quiet element received in step S603. In a case where the Quiet period ends (Yes in step S605), in step S606, the frame transceiver unit 304 cancels the transmission prohibition for the first link 104, which is the link via which the Quiet element has been received, and, if there is a frame to be transmitted, transmits the frame using this link. Note that in a case where the communication apparatus 103 has not received a Quiet element (No in step S603) or does not become aware of a Quiet period, the processing of step S606 is skipped.

Subsequently, in a case where the Probe Response frame including the transmission prohibition information indicating transmission prohibition cancellation for the first link 104 is received by the frame transceiver unit 304 of the communication apparatus 103 (Yes in step S607), the frame transceiver unit 304 determines that the first link 104 is in a transmission prohibition canceled state. Then, the frame transceiver unit 304 of the communication apparatus 103 cancels the transmission prohibition for the first link 104 (step S608) and transmits a frame using the link if there is a frame to be transmitted. Note that in a case where the transmission prohibition information included in the Probe Response frame received in step S601 includes the transmission prohibition period, upon the end of the time period, the frame transceiver unit 304 of the communication apparatus 103 may determine that the transmission prohibition for the first link 104 is in a canceled state.

Subsequently, in a case where the Multi-Link data transmission is ended due to an instruction from a user, there being no data to transmit, or the like, the communication apparatus 103 ends the processing (Yes in step S609). Otherwise (No in step S609), the processing returns to step S601.

In this manner, according to the present embodiment, with Multi-Link communication, even in a case where a link which is meant to be Quiet is caused, by the Non-AP MLD, to be in a state in which a frame cannot be received via that link, another link can be used to notify the information relating to the link which is meant to be Quiet. Accordingly, the AP MLD can appropriately execute the desired processing in the link which is meant to be Quiet.

Note that in the present embodiment, the communication apparatus 102 includes the Quiet element in the Beacon frame and transmits it. However, the Quiet element may be included in the Probe Response frame and be transmitted.

Also, in the present embodiment, the communication apparatus 102 uses the Quiet element to notify a channel which is to be made Quiet, via that channel. Alternatively, in order to indicate to move (change) the channel to be used for the link, a Channel Switch Announcement element or an Extended Channel Switch Announcement element in which the Channel Switch Mode field value is 1 may be used. In other words, the communication apparatus 102 may notify the movement of the channel to be used for the link to be made Quiet, by transmitting a frame including such an element. After the communication apparatus 102 has transmitted the frame including such an element, the communication apparatus 102 moves the channel to be used for the link via which the frame has been transmitted. In this case, as illustrated in FIG. 5, in the flowchart illustrating a flowchart that is executed in a case where the communication apparatus 102 makes a link Quiet, the processing of steps S505 to S508 may be skipped. Also, in this case, the communication apparatus 102 may transmit a frame including information for indicating movement of the channel to be used for the link (the first link 104 in the example in FIG. 4) to be made Quiet, instead of (or in addition to) transmitting a frame (for example, F403 in FIG. 4) including the transmission prohibition information.

Also, in the present embodiment, the communication apparatus 102 includes the transmission prohibition information in the Probe Response frame and transmits it. Here, the Probe Response frame can be transmitted at a discretionary timing on the basis of the DCF (Distributed Coordination Function) method defined in the IEEE 802.11 standards. Thus, after the communication apparatus 102 has decided to make a predetermined link (the first link 104 in this embodiment) Quiet, the communication apparatus 102 can swiftly notify the communication apparatus 103 of it.

Also, the communication apparatus 102 may include the transmission prohibition information in a Beacon frame to be periodically transmitted or in a FILS Discovery frame to be transmitted at periods shorter than that of the Beacon, and transmit it. In this case, a frame only for transmitting the transmission prohibition information is not transmitted, allowing the communication band to be efficiently used.

Note that at least a part of or all of the flowchart for the communication apparatus 102 and the communication apparatus 103 illustrated in FIGS. 5 and 6 may be implemented by hardware. In the case of implementing by hardware, for example, using a predetermined compiler, a dedicated circuit may be generated on an FPGA (Field Programmable Gate Array) from a program for implementing the processes and may be used. In addition, similarly to an FPGA, a gate array circuit may be formed and implemented as hardware. Also, an ASIC (Application Specific Integrated Circuit) may be used for implementation.

According to the prevent invention, it become possible to perform appropriate link management in Multi-Link communication.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, comprising:
a decision unit configured to decide a first link, from among a plurality of links established with a communication partner apparatus, wherein transmission, by the communication partner apparatus, via the first link is to be prohibited, and a transmission prohibition period for the first link; and
a transmission unit configured to transmit, using a second link different from the first link among the plurality of links, a first frame including information of the transmission prohibition period for the first link, before the transmission prohibition period starts, wherein the information of the transmission prohibition period for the first link is information represented using TBTT (Target Beacon Transmission Time) of the second link as a reference.

2. The communication apparatus according to claim 1, wherein
the decision unit decides at least one the first link or the transmission prohibition period based on an instruction from a user.

3. The communication apparatus according to claim 1, wherein
the transmission prohibition period is a periodic time period.

4. The communication apparatus according to claim 1, wherein
the first frame further includes information relating to a start timing of the transmission prohibition period for the first link.

5. The communication apparatus according to claim 1, wherein
the communication apparatus is a communication apparatus capable of multiple link communication compliant with an IEEE 802.11 series standard.

6. The communication apparatus according to claim 1, wherein
the transmission unit transmits a second frame including information relating to cancellation of transmission prohibition for the first link after the transmission prohibition period has elapsed.

7. The communication apparatus according to claim 1, wherein
the first frame is a Probe Response frame or a Beacon frame.

8. The communication apparatus according to claim 6, wherein
the second frame is a Probe Response frame, a Beacon frame, or a FILS (Fast Initial Link Setup) Discovery frame.

9. The communication apparatus according to claim 1, wherein
the communication apparatus is an AP MLD (Access Point Multi-Link Device).

10. The communication apparatus according to claim 1, wherein
the information of the transmission prohibition period for the first link is included in a Quiet element that is transmitted from the communication apparatus to the communication partner apparatus.

11. The communication apparatus according to claim 10, wherein
the Quiet element includes a Quiet Count field, a Quiet Offset field, and a Quiet Duration field.

12. A control method for a communication apparatus, the control method comprising:
deciding a first link, from among a plurality of links established with a communication partner apparatus, wherein transmission, by the communication partner apparatus, via the first link is to be prohibited, and a transmission prohibition period for the first link; and
transmitting, using a second link different from the first link among the plurality of links, a first frame including information of the transmission prohibition period for the first link, before the transmission prohibition period starts, wherein the information of the transmission prohibition period for the first link is information represented using TBIT (Target Beacon Transmission Time) of the second link as a reference.

13. A non-transitory computer-readable storage medium storing a program for a communication apparatus that when executed by the communication apparatus causes the communication apparatus to execute a control method for the communication apparatus comprising:
deciding a first link, from among a plurality of links established with a communication partner apparatus, wherein transmission, by the communication partner apparatus, via the first link is to be prohibited, and a transmission prohibition period for the first link; and
transmitting, using a second link different from the first link among the plurality of links, a first frame including information of the transmission prohibition period for the first link, before the transmission prohibition period starts, wherein the information of the transmission prohibition period for the first link is information represented using TBTT (Target Beacon Transmission Time) of the second link as a reference.

* * * * *